United States Patent Office 2,829,700
Patented Apr. 8, 1958

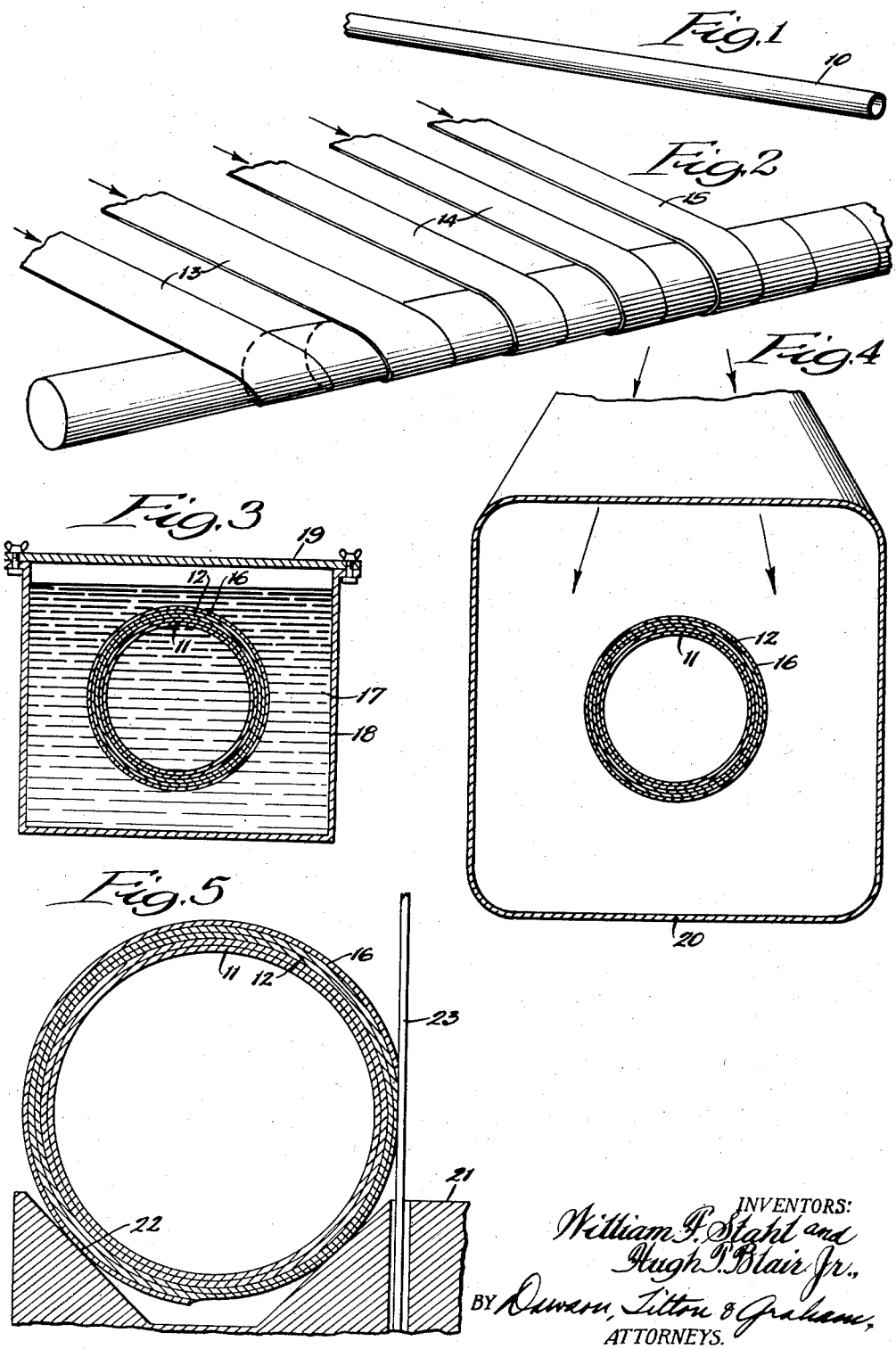

2,829,700

METHOD OF FORMING A TUBE STRUCTURE FOR ELECTRICAL APPLICATIONS

William F. Stahl, Kenilworth, and Hugh T. Blair, Jr., Chicago, Ill.

Application August 25, 1953, Serial No. 376,436

5 Claims. (Cl. 154—2.6)

This invention relates to tube structures composed of different materials integrated into a unitary tube structure, and to a method of forming the same. More particularly, the invention relates to an integrated, laminated tube and to a method of forming the tube.

There are a number of instances where a tube structure that is mechanically strong and at the same time has specialized properties not usually found in materials capable of giving the required mechanical strength could find wide use. A particular example is in the electrical industry wherein tubes used as coil forms, spacers, shafts, etc., must necessarily be mechanically strong and at the same time have good electrical properties. Good electrical properties, for example, may be the ability to resist condensation of moisture thereon, good insulating and dielectric properties, and also the property of being noncorrosive. It is difficult to combine strength and these latter properties in a single material from which a tube may be formed.

Most desirably, a tube is formed by winding a plurality of strips of material about a mandrel, one upon another, and thereby forming a laminated tube. The material employed for forming laminated tubes may be fibrous in character, such as paper, and in order to make the paper laminated tube mechanically strong, impregnation is suggested, wherein a resin or other impregnating varnish is dispersed throughout the paper and upon hardening provides a rigid and strong tube. Such tubes, however, do not have good electrical properties. On the other hand, if the tubes are formed from a material having the required specialized properties, the material quite frequently is not adapted to impregnation and by itself will not furnish a tube structure having the mechanical strength necessary for use as spacers, coil forms, etc.

Heretofore there has been known no good way of forming tube structures wherein different materials are employed, one being particularly adapted to be impregnated and to thereby provide strength and rigidity, the other having special properties adapted to particular uses. Because of this limitation, the usual procedure has been to form the required supports for coil forms, etc. from expensive and heavy ceramics or certain molded plastics. The use of ceramics and the expensive plastics is undesirable because they most generally add weight and size to the structure in which they are incorporated, and at the same time are expensive and frequently fragile.

It is, accordingly, an object of this invention to provide an inexpensive tube structure and method of forming the same that has high mechanical strength combined with chosen specialized properties. Another object of the invention is in providing a tube structure and method of forming the same in which an inner tube structure having high mechanical strength is integrated with an outer covering or tube structure having specialized characteristics such as those hereinbefore set out, but that may not, in itself, have the necessary tensile strength to permit independent use thereof. Still another object is in the provision of a laminated tube and method of forming the same wherein separate materials are used, each providing special properties, but being integrated into a unitary tube structure. Yet another object is in providing such a tube structure and in which the structure is subjected to an impregnation step and heat is subsequently applied thereto; heat being operative with the impregnation to integrate the materials. A further object of the invention is in providing a tube structure and method of forming the same wherein a tube is formed by laminating several layers of a paper receptive to impregnation one upon another to provide the tube and at the same time winding there-about a layer of a plastic material having specialized properties making it especially attractive for use in electrical applications; the tube structure thus formed being enclosed in a sleeve and the entire member being immersed in an impregnation bath to impregnate the laminated paper portion of the tube and thereafter heating the structure to a temperature above the melting point of the plastic; the outer sleeve being effective to confine the plastic and, after cooling, the final product being a tube structure wherein the paper and plastic materials are integrated. Additional objects and advantages will appear as the specification proceeds.

An embodiment of the invention is illustrated in the accompanying drawing, in which—

Figure 1 is a broken perspective view of a tube formed in accordance with our invention; Figure 2, a broken perspective view showing the winding of the laminations to form the tube; Figure 3, a transverse sectional view showing the tube structure immersed in an impregnating bath; Figure 4, a view showing the tube after impregnation being passed through an oven and in which the particular illustration is a transverse sectional showing; and Figure 5, an enlarged transverse sectional view showing the tube structure after being dried positioned in a centerless grinder.

The completed tube structure is illustrated in Figure 1 and is designated with the numeral 10. In the steps of forming the tube 10, an inner tube portion 11 is first provided that has certain required properties and preferably has good mechanical strength. About the inner tube 11 is formed a covering or outer tube 12, and the inner and outer tubes 11 and 12 are then integrated by means of impregnation and heat, as will be subsequently described.

Preferably, the inner tube 11 is a laminated tube and is formed by spirally winding a plurality of strips of paper 13 about a mandrel. The strips 13 are wound in offset relation, so that the later strip substantially encloses the seam provided by the prior wound strips. Any number of strips 13 may be employed, and, in the particular illustration given, for purposes of clarity, two paper strips 13 are illustrated. The spiral winding of paper strips about a mandrel to form a spirally-wound laminated tube is old and well known in the art, and a further discussion thereof in detail is believed unnecessary.

Although we prefer to use paper strips 13 in forming the inner tube 11, it should be understood that other materials may be used for this purpose. Specifically, any number of fibrous materials are suitable, and it is desirable only that the material, when subsequently impregnated, form a tube structure having high mechanical strength.

Simultaneously with the spiral winding of the strips 13 to form the inner tube 11, strips 14 of plastic are wound about the inner tube 11 to form a covering or an outer tube there-about. The plastic used is one chosen for its specialized properties, and if the tube is to be used for coil forms, etc., most desirably the plastic is resistant to corrosion, resistant to condensation of moisture, and at the same time has high dielectric and insulating properties. We prefer to use cellulose acetate, which has all of the properties set out, but it should be understood that other plastic materials may readily be used. For example, ethyl cellulose, polystyrene, and polyethylene have all been used quite effectively.

The plastic strips 14 are spirally wound in the same manner as the strips 13, and it is believed unnecessary to further describe the spiral winding operation since, as has been indicated, it is well known in the art.

At the same time that the fibrous strips 13 and plastic strips 14 are being spirally wound to form the inner and outer tube members 11 and 12, we wind about the entire structure a strip of material 15 that forms a sleeve or coving for the entire tube structure. Any material may be used to provide the sleeve, which is indicated in the figures by the numeral 16. The purpose of the sleeve 16 provided by the spirally-wound strip of material 15 is to enclose the plastic tube 12 and to confine the plastic material during the heating step which will be later described in detail. The material 15 may be, for example, paper, and, if desired, the paper may be gummed so that it sticks to the plastic or to itself, if it is wound in overlapping relation, during the spiral winding thereof on the tube structure.

After these winding operations, wherein the inner tube 11, outer tube 12, and sleeve 16 there-about are formed, the entire tube structure is immersed in an impregnating bath 17 provided within a tank 18. The tank 18 is of the usual construction and preferably has a cover 19 that is removable to permit the tube structures to be inserted and withdrawn from the bath 17. Impregnation tanks of this general character are well known, and the removable cover 19 should provide a sufficiently tight fit with the remainder of the tank so as to enable a vacuum and pressure to be alternately applied thereto, as is usual in impregnating materials. The impregnating bath 17 may be any of the usual impregnating materials, and these are most generally referred to as "impregnating varnishes." Particularly suitable are resin plastics and, for example, phenol formaldehyde provides a suitable impregnating material. The impregnation of the inner tube 11 is for the purpose of providing a rigid and mechanically strong tube structure.

The impregnating material will not ordinarily affect the plastic outer tube 12 and the impregnation will occur only throughout the inner tube 11. Whether or not the outer sleeve 16 is impregnated will depend largely upon the particular material from which it is formed. If paper is used in the formation of the sleeve 16, then a certain amount of impregnation of this sleeve will occur. If a gummed paper is used to form the sleeve 16, the impregnation will occur only outwardly from the gummed coating and will not penetrate therethrough.

After the tube structure has been thoroughly impregnated in the tank 18, it is removed therefrom and permitted to dry. Preferably, the drying takes place within an oven 20, illustrated diagrammatically in Figure 4. The temperature in the oven 20 is raised to a point above the melting temperature of the plastic strips 14, and normally this would cause the plastic to melt and run from the impregnated inner tube 11. However, the outer sleeve 16 functions to confine the softened or melted plastic, and the plastic is unable, even though in fluid form, to drain or run from the inner impregnated tube 11. The plastic is then confined about the inner tube 11 and within the outer sleeve 16.

As a specific example of the temperature that may be employed in the oven 20, the following is set out: The plastic material used to form the outer tube 12 was cellulose acetate, and this material softens and flows at a temperature of about 180° F. After impregnation, the tube structure was placed in an oven and the temperature of the oven was raised to a value of about 280° F. Though this latter temperature is in excess of the temperature at which the cellulose acetate plastic flows, it was found that the outer sleeve 16 confined the fluid plastic and no flowing of the plastic occurred.

Any suitable oven 20 may be employed to elevate the temperature of the tube. For example, the oven 20 may be elongated and the tube move slowly therethrough but continuously. Heat may be provided in any number of ways, and we have found it particularly desirable to provide infrared heating by mounting appropriate infrared lights along the path of travel of the tube within the oven 20. Any desired means may be employed to move the tube structure through the oven, and, if desired, a conveyor may be adopted for this purpose.

After the tube has passed through the oven 20 and is thoroughly dried, the dry impregnated tube structure may be immediately stored until it is to be used at some subsequent time, or the plastic may be permitted to cool to the hardening temperature thereof and the tube then placed in a grinder to remove the outer sleeve 15 and leave only the impregnated inner tube 11 and outer plastic tube 12 there-about.

Any well known means may be employed for removing the outer sleeve 16. We have found that a centerless grinder such as the one indicated in Figure 5 and designated with the numeral 21, is suitable for this purpose. In such a grinding operation, the tube is supported within a generally V-shaped channel 22 and an endless belt 23 that is driven engages the surface of the tube and removes the outer sleeve 16 therefrom. Centerless grinders are common and are well known, and it is believed that these need not be described in detail for purposes of understanding the present invention. It will be appreciated that the endless belt 23 is continually driven by a suitable motor or other drive means. The tube structure will rotate within the V-shaped support channel 22 because of the frictional engagement between the outer surface of the tube and the endless belt 23, and all portions of the tube will be subjected to the belt 23 and the outer sleeve 16 will thereby be completely removed therefrom.

Not only is the grinder 21 operative to remove the outer sleeve 16, but at the same time it may be adjusted to remove a portion of the plastic tube 12 so as to provide an accurately dimensioned tube structure, that is to say, the grinding operation may be utilized also for providing a tube having a specific outer diameter. In the event that a very precise outer diameter is required, it should be understood that other grinders may be employed, and usually in such cases we use the usual rotating abrasive wheel wherein the amount of material removed from the tube may be accurately controlled.

After the sleeve 16 has been removed and the tube ground to size, if this is required, the tube structure is ready for immediate use and may be employed as a coil form or spacer, etc., in electrical apparatus. The tube will have the required mechanical strength in that the impregnated fibrous material forming the inner tube 11 is quite rigid and has exceedingly good mechanical strength. On the other hand, the outer tube 12 formed of the plastic strips 14 which were chosen to provide the specialized requirements desirable for a chosen use, will provide these properties. The tube structure then is both mechanically strong and has good electrical properties.

It was found, suprisingly, that after impregnating the inner tube 11 and after the impregnated tube structure was passed through the oven 20 wherein the temperature was raised above the melting point of the plastic, that an integration between the inner tube 11 and outer tube 12 took place. More specifically, the uniting of the inner and outer tubes 11 and 12 is much more than simply a tight mechanical bond between the two limited to high frictional resistance against relative movement therebetween, but, on the contrary, the integration actually results in the blending together of the outer surface of the inner tube 11 and inner surface of the outer tube 12 to form, in effect, but a single unitary tube.

Also quite surprising was the discovery that the tube structure formed in accordance with the process set out will not shatter when crushed. Usually when a tube is impregnated and becomes rigid, and compressive forces are applied across the periphery thereof, the tube cracks and shatters when the forces become excessive. With this tube structure, however, there is no cracking or shattering of the tube when large forces are applied across the periphery thereof, but, on the contrary, the tube acts in a manner quite similar to safety glass found in most automobiles, wherein when cracked, it does not shatter, but clings together. This nonshattering or shatter-proof effect is present in our tube structure, and is very advantageous for compressive or transverse forces are applied across a tube during a coil winding operation and such forces, too frequently, cause the tube to shatter.

In our tube, however, the tube does not shatter regardless of the magnitude of the compressive forces applied thereto. If a sufficiently large force is applied, the tube will crack but does not shatter. Moreover, it is found that a force which is of sufficient magnitude to shatter a conventional impregnated tube is ineffective to crack the tube structure we provide.

It will be appreciated that although the tube structure illustrated is cylindrical, tubes may be made in accordance with this invention having any desired configuration. For example, the tubes may be oval, square, rectangular, etc.

While in the foregoing specification an embodiment of the invention has been set out in considerable detail, both as to the structure and method, for purposes of illustration, it should be understood that those skilled in the art may make considerable change in these details without departing from the spirit and principles of the invention.

We claim:

1. In a process for forming a tube structure, the steps of providing an inner tube of fibrous material, providing an outer tube thereabout of plastic material, enclosing said inner and outer tubes in a sleeve, subjecting the structure thus formed to a resinous impregnating bath to impregnate said fibrous inner tube, withdrawing the structure from the impregnating bath and elevating the temperature thereof above the melting point of the plastic, and removing said outer sleeve after the plastic has solidified.

2. In a method of forming a tube structure, the steps of forming an inner tube of material receptive to varnish impregnation, forming about said inner tube an outer tube of plastic material substantially unreceptive to varnish impregnation, enclosing said inner and outer tubes in a sleeve, varnish impregnating said inner tube, heating said tubes and sleeve to a temperature above the melting-point of the plastic, and removing said sleeve after said plastic tube has hardened.

3. In a process for forming a tube structure, the steps of providing an inner tube of fibrous material, providing an outer tube thereabout of plastic material, enclosing said inner and outer tubes in a sleeve, subjecting the structure thus formed to a resinous impregnating bath to impregnate said fibrous inner tube, withdrawing the structure from the bath and heating the same above the melting-point of the plastic, and removing said sleeve.

4. In a method for forming a tube structure, the steps of providing an inner tube of fibrous material, providing an outer tube thereabout of plastic material, enclosing said inner and outer tubes in a sleeve, subjecting the structure thus formed to a resinous impregnating bath to impregnate said fibrous inner tube, withdrawing the structure from the impregnating bath, elevating the temperature thereof above the melting-point of the plastic while confining the plastic outer tube about the inner tube by means of the sleeve, and then removing the tube structure from the means for elevating the temperature thereof to solidify the plastic.

5. In a process for forming a tube structure, the steps of providing an inner tube receptive to resin impregnation, providing a cellulose acetate tube about said inner tube, enclosing said inner and outer tubes in a sleeve, resin-impregnating said inner tube, heating the tube structure to a temperature above the melting-point of the cellulose acetate while confining the cellulose acetate outer tube about the inner tube, and then removing the tube structur from the means for heating the tube structure to solidifying the cellulose acetate.

References Cited in the file of this patent

UNITED STATES PATENTS

| | | |
|---|---|---|
| Re. 22,532 | Lutz | Aug. 22, 1944 |
| 836,863 | Clausen | Nov. 27, 1906 |
| 1,818,976 | Goff | Aug. 18, 1931 |
| 2,014,399 | Sprague | Sept. 17, 1935 |
| 2,181,035 | White | Nov. 21, 1939 |
| 2,279,630 | McMahon | Apr. 14, 1942 |
| 2,354,556 | Stahl | July 25, 1944 |
| 2,478,181 | Coker et al. | Aug. 9, 1949 |
| 2,536,243 | Walker et al. | Jan. 2, 1951 |
| 2,653,887 | Slayter | Sept. 29, 1953 |
| 2,710,026 | Stewart et al. | June 7, 1955 |
| 2,755,821 | Stahl | July 24, 1956 |